United States Patent
Won et al.

(10) Patent No.: US 8,107,262 B2
(45) Date of Patent: Jan. 31, 2012

(54) VARIABLE SWITCHING FREQUENCY TYPE POWER SUPPLY

(75) Inventors: Jae Sun Won, Gyunggi-Do (KR); Sung Soo Hong, Gyunggi-Do (KR); Chung Wook Roh, Seoul (KR); Sang Kyoo Han, Daejeon (KR); Jong Sun Kim, Gyunggi-Do (KR); Dong Seong Oh, Incheon (KR); Tae Won Heo, Gyunggi-Do (KR); Dong Joong Kim, Gyunggi-Do (KR); Don Sik Kim, Gyunggi-Do (KR); Hak Ryong Kim, Gyunggi-Do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 543 days.

(21) Appl. No.: 12/332,217

(22) Filed: Dec. 10, 2008

(65) Prior Publication Data

US 2010/0014321 A1    Jan. 21, 2010

(30) Foreign Application Priority Data

Jul. 17, 2008  (KR) .................. 10-2008-0069710

(51) Int. Cl.
*H02M 3/335* (2006.01)
(52) U.S. Cl. .................... 363/21.02; 363/16; 363/132
(58) Field of Classification Search .......... 363/16–20, 363/39, 41, 45, 47, 97, 98, 131, 132, 65, 363/56.11, 21.02, 21.06; 323/222, 224, 225
See application file for complete search history.

(56) References Cited

U.S. PATENT DOCUMENTS

| | | | |
|---|---|---|---|
| 5,808,879 A * | 9/1998 | Liu et al. ................. | 363/17 |
| 6,344,979 B1 * | 2/2002 | Huang et al. ............. | 363/16 |
| 6,356,462 B1 | 3/2002 | Jang et al. | |
| 7,088,600 B2 * | 8/2006 | Mehas et al. ............. | 363/49 |
| 7,209,370 B2 * | 4/2007 | Phadke et al. ............ | 363/17 |
| 7,375,994 B2 * | 5/2008 | Andreycak ............... | 363/89 |
| 7,400,061 B2 * | 7/2008 | Steigerwald et al. ..... | 307/17 |
| 7,760,521 B2 * | 7/2010 | Huang ....................... | 363/22 |
| 2002/0064058 A1 | 5/2002 | Zhang et al. | |
| 2005/0041439 A1 | 2/2005 | Jang et al. | |

OTHER PUBLICATIONS

Hang-Seok Choi, Ph.D., "Half-bridge LLC Resonant Converter Design Using FSFR-series Fairchild Power Switch," Fairchild Semiconductor Corporation, Application note AN-4151, pp. 1-17 (Oct. 9, 2007).
Application Note AN2450, "LLC Resonant Half-bridge Converter Design guideline," www.st.com, pp. 1-32 (Oct. 2007).
Korean Office Action for application No. 10-2008-0069710, issued Feb. 26, 2010.

* cited by examiner

*Primary Examiner* — Rajnikant Patel
(74) *Attorney, Agent, or Firm* — Lowe, Hauptman, Ham & Berner, LLP (57) ABSTRACT

There is provided a variable switching frequency type power supply that can achieve high efficiency by fixing a switching duty cycle to 50% and varying switching frequency. A variable switching frequency type power supply according to an aspect of the invention may include: a switching unit switching input power; a transformation unit converting a voltage level of the power switched by the switching unit into a predetermined voltage level; a rectification unit rectifying the power converted by the transformation unit; and a control unit fixing a switching duty cycle of the switching unit to a predetermined switching duty cycle, and varying switching frequency of the switching unit according to a voltage level of output power.

12 Claims, 5 Drawing Sheets

VARIABLE SWITCHING FREQUENCY TYPE POWER SUPPLY

CROSS-REFERENCE TO RELATED APPLICATIONS

This application claims the priority of Korean Patent Application No. 2008-0069710 filed on Jul. 17, 2008, in the Korean Intellectual Property Office, the disclosure of which is incorporated herein by reference.

BACKGROUND OF THE INVENTION

1. Field of the Invention

The present invention relates to power supplies, and more particularly, to a variable switching frequency type power supply that can achieve high efficiency by fixing a switching duty cycle to 50% and varying switching frequency.

2. Description of the Related Art

In general, power supplies convert input power, supplied from the outside, into power having a current level or a voltage having a magnitude determined by a user, and supply the converted input power to corresponding apparatuses. The power supplies are widely used for home appliances and information communication devices, such as portable terminals, notebook computers, LCD monitors, and network servers.

The power supply alternately switches the input power at a switching duty cycle to convert the input power to usable power. Here, the switching duty cycle is generally set within a range of approximately 0.3 to 0.35 in order to ensure an operating margin for a voltage sag or a variation of input power.

Here, a circulating current interval occurs in which input energy is not transmitted to an output terminal but circulates within an input circuit. Therefore, zero voltage switching is not ensured. As a result, conduction loss is caused during switching, elements involved in the switching generate high heat, the efficiency of the power supply is reduced, and an increase in output ripple current occurs.

SUMMARY OF THE INVENTION

An aspect of the present invention provides a variable switching frequency type power supply that can achieve high efficiency by fixing a switching duty cycle to 50% and varying switching frequency.

According to an aspect of the present invention, there is provided a variable switching frequency type power supply including: a switching unit switching input power; a transformation unit converting a voltage level of the power switched by the switching unit into a predetermined voltage level; a rectification unit rectifying the power converted by the transformation unit; and a control unit fixing a switching duty cycle of the switching unit to a predetermined switching duty cycle, and varying switching frequency of the switching unit according to a voltage level of output power.

The transformation unit may include: a transformer converting the voltage level of the power switched by the switching unit according to a predetermined turn ratio between a primary winding electrically connected to the switching unit and a secondary winding electrically connected to the rectification unit; a series boost capacitor connected in series between the switching unit and the primary winding of the transformer, and boosting the power switched by the switching unit; and a magnetized inductor connected in parallel with the primary winding of the transformer, and resonating with the series boost capacitor.

A resonant frequency of the serial boost capacitor and the magnetized inductor may be lower than the switching frequency of the switching unit.

The switching unit may switch the input power by using one switching method between a full bridge switching method of using two pairs of switches connected in parallel with an input power terminal, each pair of switches being connected in series with each other, and a half bridge switching method of using one pair of switches connected in series with each other, and connected in parallel with the input power terminal.

The half bridge method may further include one pair of capacitors connected in series with each other, and connected in parallel with the input power terminal.

A center tap may be provided on the secondary winding to halve the number of turns of the secondary winding.

The rectification unit may rectify the power converted by the transformation unit by using one rectification method among a full wave rectification method of using four diodes electrically connected between the secondary winding of the transformer and an output power terminal, a half wave rectification method of using two diodes connected in series with each other between the secondary winding and the output power terminal, and a rectification method of using two diodes connected in parallel with the secondary winding and having anodes connected in series with each other.

The rectification unit may further include: an output inductor reducing a pulsation current of the power rectified by the diodes; and an output capacitor charging the power rectified by the diodes to stabilize the power.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
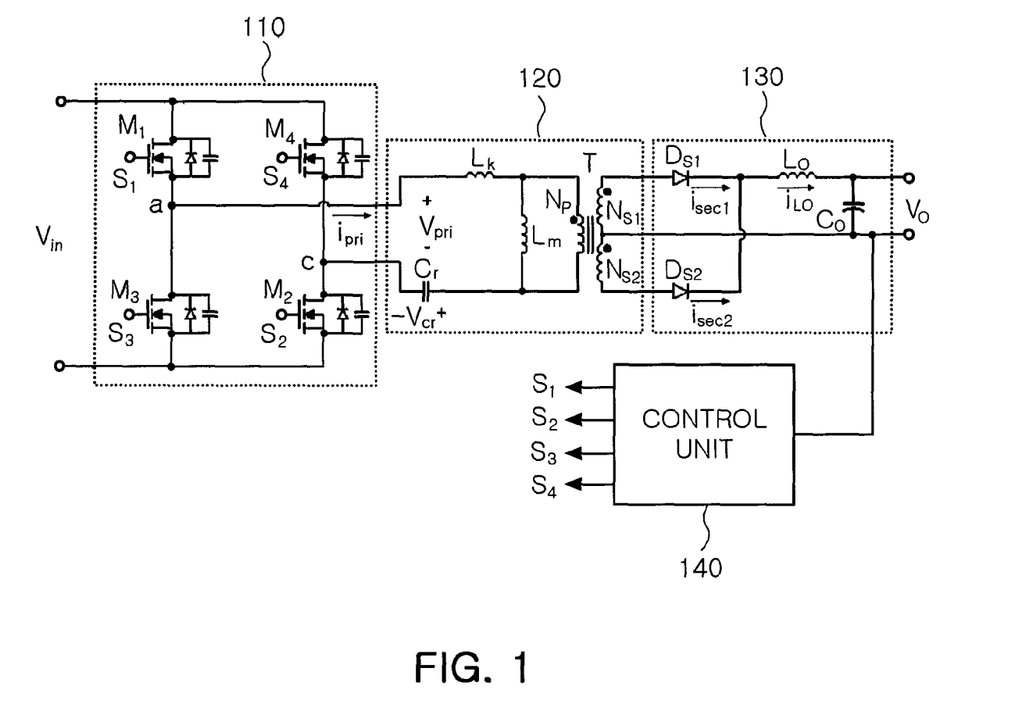
FIG. 1 is a configuration view illustrating a power supply according to an exemplary embodiment of the invention.

FIG. 1 is a configuration view illustrating a power supply according to an exemplary embodiment of the invention.

Referring to FIG. 1, a power supply 100 according to this embodiment includes a switching unit 110, a transformation unit 120, a rectification unit 130, and a control unit 140.

The switching unit 110 switches input power Vin. The switching unit 110 includes first to fourth switches M1 to M4 that alternately switch the input power Vin. The first to fourth switches M1 to M4 may be connected in a full bridge configuration so that the first and second switches M1 and M2 and the third and fourth switches M3 and M4 are alternately switched on and off. That is, when the first and second switches M1 and M2 are switched on or off at the same time, the third and fourth switches M3 and M4 are switched off or on at the same time.

Figure 3A:
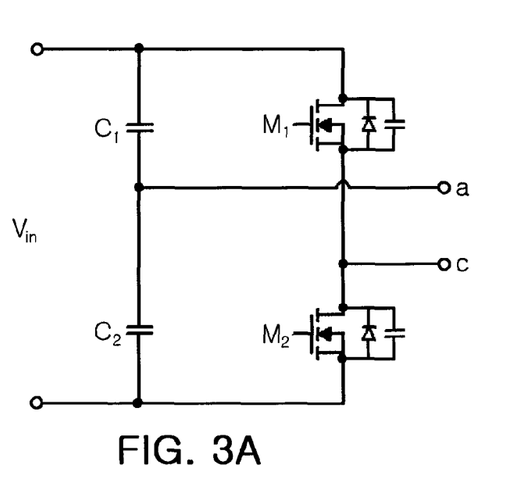
FIGS. 3A and 3B are configuration views illustrating examples of a switching unit used in the power supply according to the embodiment illustrated in FIG. 1.
Figure 3B:
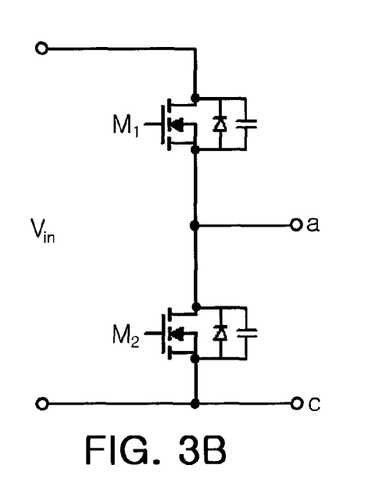

Further, as shown in FIGS. 3A and 3B, the switching unit 110 may have two switches M1 and M2 connected in a half bridge configuration. That is, the switches M1 and M2 are connected in series with each other, and connected in parallel with a power input terminal, so as to alternately switch the input power Vin. As shown in FIG. 3A, two input capacitors C1 and C2 connected in series with each other may be connected in parallel with each other between the power input terminal and the switch pair including the switches M1 and M2.

The transformation unit 120 converts a voltage level of the power switched by the switching unit 110 into a predetermined voltage level. Therefore, the transformation unit 120 includes a transformer T that converts a voltage level of DC power from the switching unit 110. The transformer T includes a primary winding Np and secondary windings Ns1 and Ns2. A turn ratio between the primary winding Np and the secondary windings Ns1 and Ns2 determines a ratio of converting a voltage level of the DC power.

A leakage inductor Lk and a series boost capacitor Cr may be connected in series with each other between the primary winding Np of the transformer T and the switching unit 110. A magnetized inductor Lm may be connected in parallel with the primary winding Np. The leakage inductor Lk and the magnetized inductor Lm may be formed by the transformer T. Alternatively, the leakage inductor Lk may be formed of separate inductor elements.

The series boost capacitor Cr boosts the power switched by the switching unit 110, and transmits the boosted power to the transformer T.

The power converted by the secondary windings Ns1 and Ns2 of the transformer T of the transformation unit 120 is transmitted to the rectification unit 130. The rectification unit 130 rectifies the power converted by the transformation unit 120 and outputs the rectified power. The rectification unit 130 may include a plurality of diodes Ds1 and Ds2 that rectify the power converted by the transformation unit 120. The rectification unit 130 may also include an output inductor Lo and an output capacitor Co. The output inductor Lo suppresses a pulsation current of the power rectified by the plurality of diodes Ds1 and Ds2. The output capacitor Co stabilizes the power filtered by the output inductor Lo.

As shown in FIG. 1, in the transformation unit 120, a center tap may be formed between the secondary windings Ns1 and Ns2 of the transformer T. The two diodes Ds1 and Ds2 are connected to one set of ends of the secondary windings Ns1 and Ns2 of the rectification unit 130, respectively. Outputs from the two diodes Ds1 and Ds2 are added and input to the output inductor Lo.

Figure 4A:
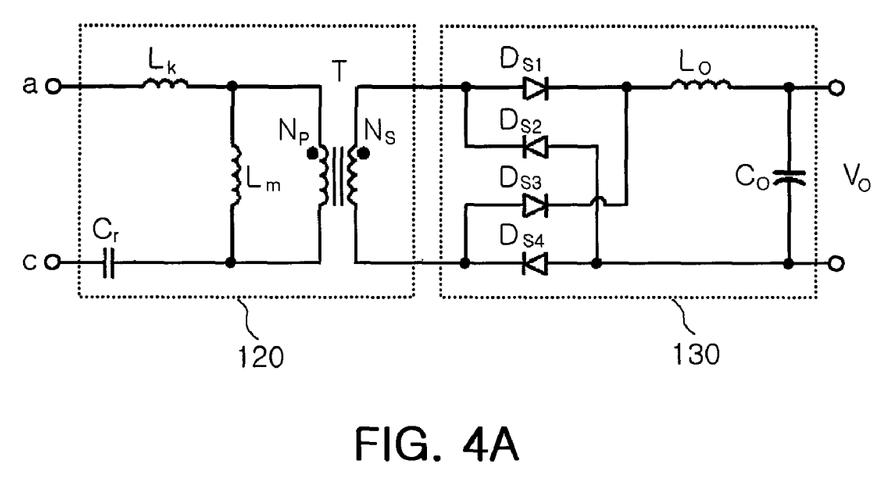
FIGS. 4A and 4B are configuration views illustrating examples of a transformation unit and a rectification unit used in the power supply according to the embodiment illustrated in FIG. 1.
Figure 4B:
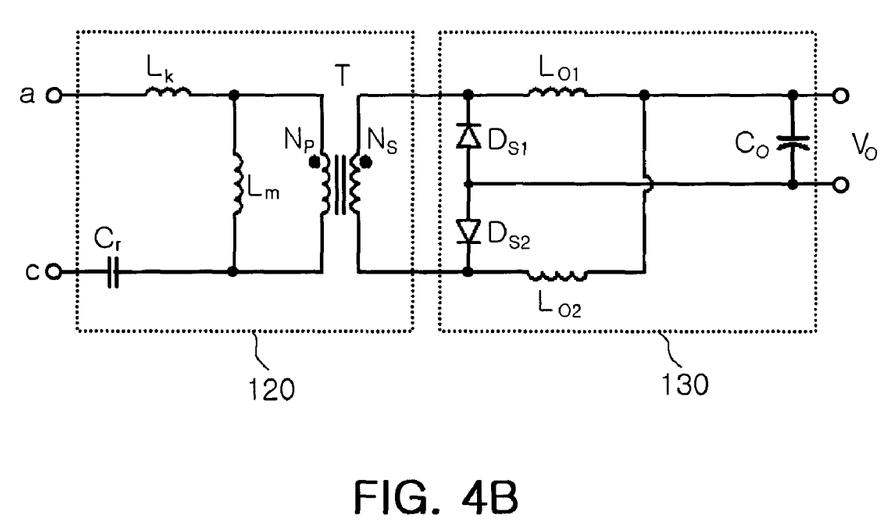

Further, like examples of the transformation unit 120 and the rectification units 130 as shown in FIGS. 4A and 4B, a center tap may not be connected to a secondary winding Ns in the transformation unit 120 (refer to FIGS. 4A and 4B). The rectification unit 130 may have a full-wave rectification configuration in which four diodes Ds1 to Ds4 are connected at both ends of the secondary winding Ns (refer to FIG. 4A). Two diodes Ds1 and Ds2 are connected at both ends of the secondary winding Ns. The two diodes Ds1 and Ds2 have anodes connected in series with each other, and cathodes connected to one end and the other end of the secondary winding Ns (refer to FIG. 4B).

Output powers of the diodes Ds1 and Ds2 are transmitted to first and second inductors Lo1 and Lo2, respectively. The powers filtered by the first and second output inductors Lo1 and Lo2 may be transmitted to the output capacitor Co (refer to FIG. 4B).

The control unit 140 detects the output power from the rectification unit 130, and controls the switching of the switching unit 110. The control unit 140 fixes a switching duty cycle of the switching unit 110, detects the output power from the rectification unit 130, and varies switching frequency of the switching unit 110 according to the detected output power. First to fourth switching control signals S1 to S4 from the control unit 140 are transmitted to the first to fourth switches M1 to M4 of the switching unit 110, respectively, so as to control the operations of the respective switches.

Figure 2:
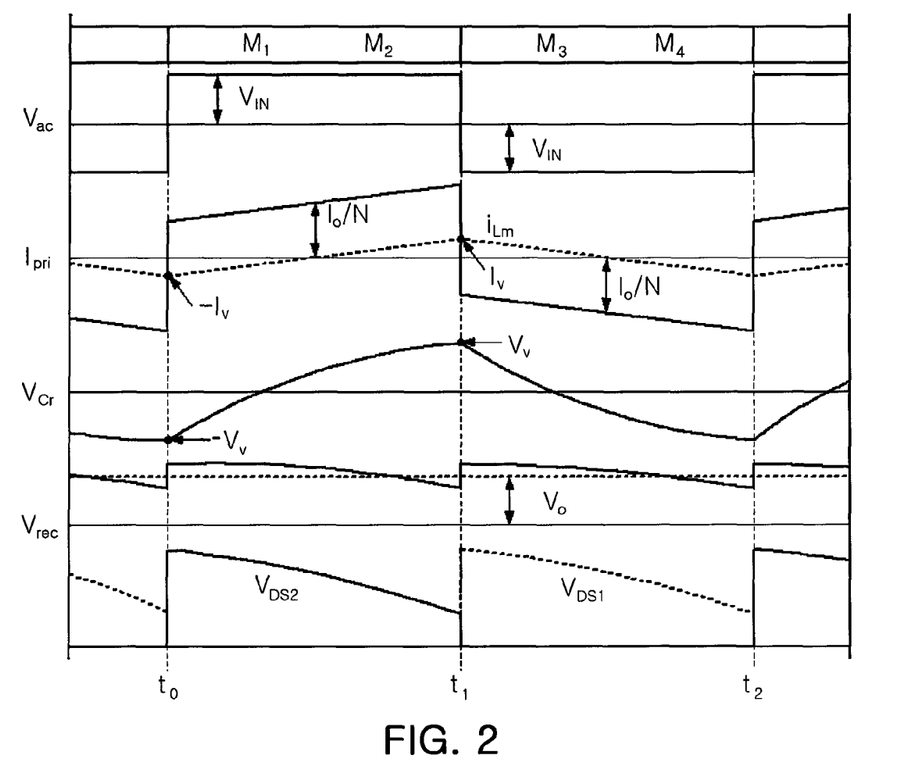
FIG. 2 is an operating waveform illustrating important parts of the power supply according to an exemplary embodiment of the invention.
Figure 5A:
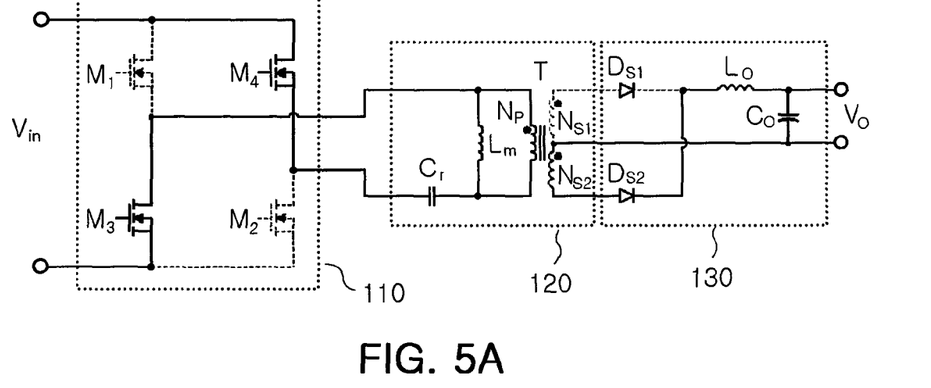
FIGS. 5A, 5B, and 5C are views illustrating electrical conduction paths of the power supply according to the embodiment illustrated in FIG. 1.
Figure 5B:
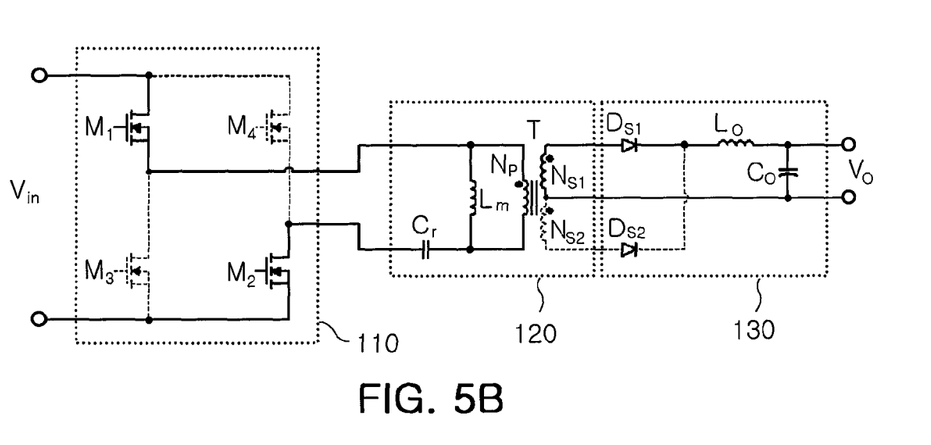
Figure 5C:
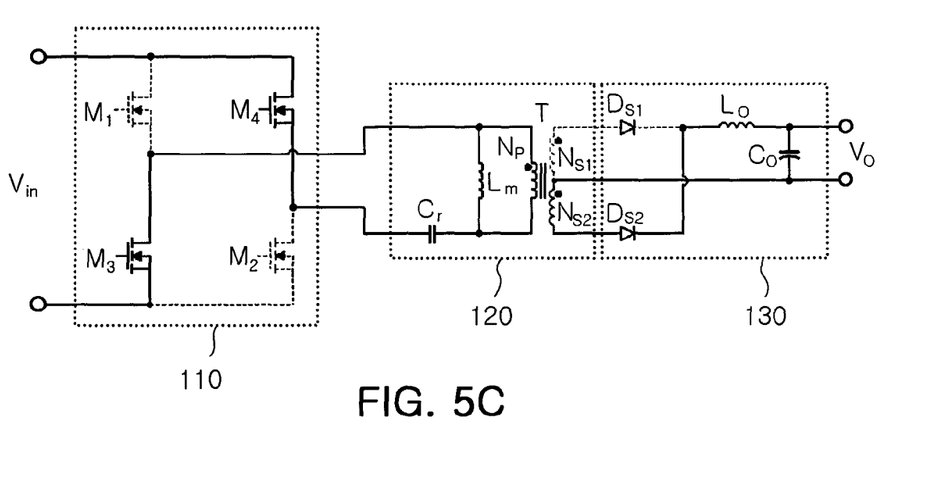

FIG. 2 is an operating waveform of important parts of a power supply according to an embodiment of the invention. FIGS. 5A, 5B, and 5C are views illustrating electrical conduction paths of the power supply according to the embodiment illustrated in FIG. 1.

The operation of the power supply according to the embodiment of the invention will be described with reference to FIGS. 1 and 2, and FIGS. 5A, 5B, and 5C. An operating duty cycle of the first and third switches M1 and M3 or the second and fourth switches M2 and M4 is fixed to 50% at all times. Dead time between the first and third switches M1 and M3 or the second and fourth switches M2 and M4 is small enough to ignore.

In the operating waveform of FIG. 2, since the third and fourth switches M3 and M4 are turned on before a time $t_0$, a conduction path, shown in solid line in FIG. 5A, is formed, and the rectified power is transmitted to the output terminal through the second rectifier diode Ds2. The above-described operation is completed at the time $t_0$. Here, a voltage $V_{Cr}(t_0)$ of the series boost capacitor Cr is discharged to a voltage −Vv. A current $i_{Lm}(t_0)$ of the magnetized inductor Lm is reduced to a current −Iv. (Here, −Vv and −Iv refer to a minimum voltage and a minimum current, and Vv and Iv refer to a maximum voltage and a maximum current).

Then, if the first and second switches M1 and M2 are turned on at the time $t_0$, a conduction path, shown in solid line in FIG. 5B, is formed, and the rectified power is transmitted to the output terminal through the first rectifying diode Ds1. As the voltage $V_{in}$ of the input power and the voltage $V_{cr}$ from the series boost capacitor are applied as a voltage $V_{pri}$ applied to the primary winding Np of the transformer T, a current $i_{Lm}$ flowing through the magnetized inductor Lm and a current $i_{pri}$ flowing through the primary winding Np of the transformer T are increased by the following equation:

$$i_{Lm}(t) = \frac{V_{in} + V_{cr}(t)}{L_m}t - I_v \quad \text{Equation 1}$$

$$i_{pri}(t) = i_{Lm}(t) + \frac{I_o}{N}.$$

Here, the series boost capacitor Cr is charged by the current $i_{pri}$ flowing through the primary winding Np of the transformer T by the following equation:

$$v_{Cr}(t) = \int_{t_0}^{t} i_{pri}(t)dt - V_v \quad \text{Equation 2}$$
$$= \int_{t_0}^{t} i_{Lm}(t) + \frac{I_o}{N} dt - V_v$$
$$= \int_{t_0}^{t} \frac{V_{in} + V_{Cr}(t)}{L_m} t - I_v + \frac{I_o}{N} dt - V_v.$$

Finally, the third and fourth switches M3 and M4 are turned on at the time $t_1$, a conduction path, shown in solid line in FIG. 5C, is formed, and the rectified power is transmitted to the output terminal through the second rectifier diode Ds2. As a difference between the voltage $V_{in}$ of the input power and the voltage $V_{cr}$ from the series boost capacitor is applied as the voltage $V_{pri}$ applied to the primary winding Np of the transformer T, the current $i_{Lm}$ flowing through the magnetized inductor Lm, and the current $i_{pri}$ flowing through the primary winding Np of the transformer T are decreased by the following equation:

$$i_{Lm}(t) = -\frac{V_{in} + V_{cr}(t)}{L_m} t + I_v \quad \text{Equation 3}$$
$$i_{pri}(t) = i_{Lm}(t) - \frac{I_o}{N}.$$

Here, the series boost capacitor Cr is discharged by the current $i_{pri}$ flowing through the primary winding Np of the transformer T by the following equation:

$$v_{Cr}(t) = \int_{t_0}^{t} i_{pri}(t)dt + V_v \quad \text{Equation 4}$$
$$= \int_{t_0}^{t} i_{Lm}(t) - \frac{I_o}{N} dt + V_v$$
$$= \int_{t_0}^{t} -\frac{V_{in} + V_{Cr}(t)}{L_m} t + I_v - \frac{I_o}{N} dt + V_v.$$

Then, the above-described processes are repeated.

Several electrical assumptions may be made in the above-described operation of the power supply according to the embodiment of the invention. Currents $i_{DS1}$ and $i_{DS2}$ flowing through first and second rectifier diodes, respectively, have the same average current, which corresponds to half of an output current $i_o$. Since the current $i_{pri}$ flowing through a primary winding of a transformer series has an average current of '0' by a boost capacitor Cr, a current $i_{Lm}$ of a magnetized inductor Lm of the transformer has an offset current of '0'. Since the inductance of the leakage inductor Lk is small enough to ignore as compared with the inductance of the magnetized inductor Lm, it may be omitted when analyzing the operation.

As described above, in the power supply according to this embodiment, the series boost capacitor Cr of the transformation unit 120 increases or decreases according to the switching frequency, and a voltage level of the output power is correspondingly controlled. This will be described in detail with reference to the accompanying drawings.

Figure 6A:
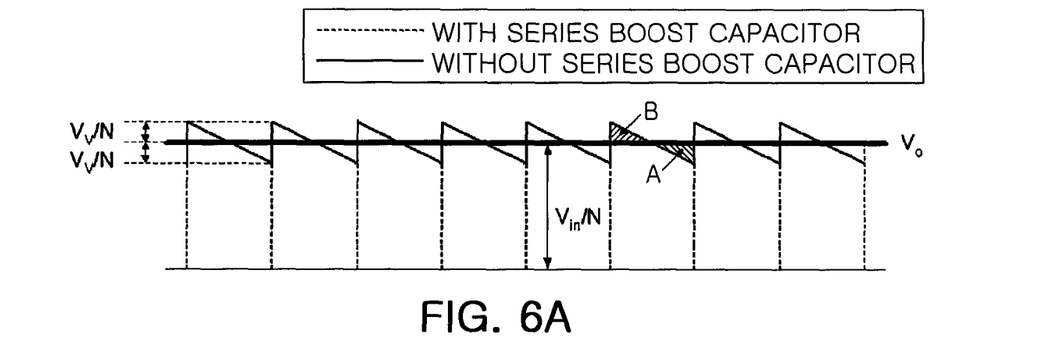
FIGS. 6A, 6B, and 6C are views illustrating the principle in which output power of a power supply has a constant voltage according to an exemplary embodiment of the invention.
Figure 6B:
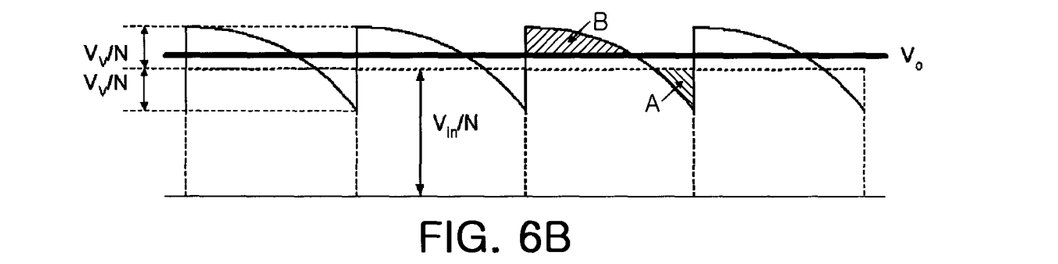
Figure 6C:
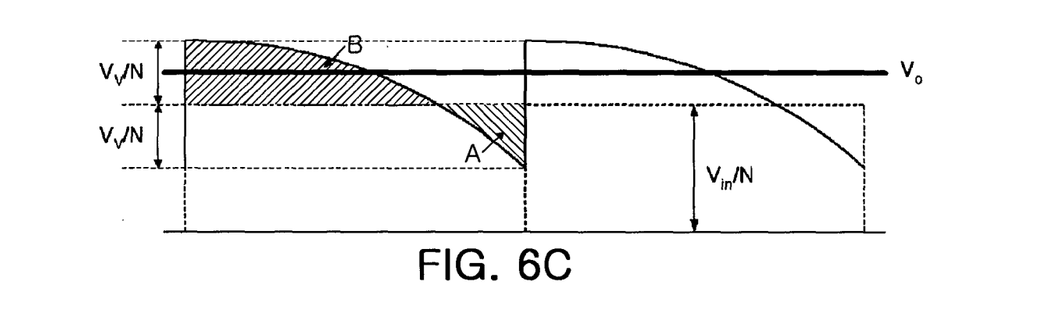
Figure 7:
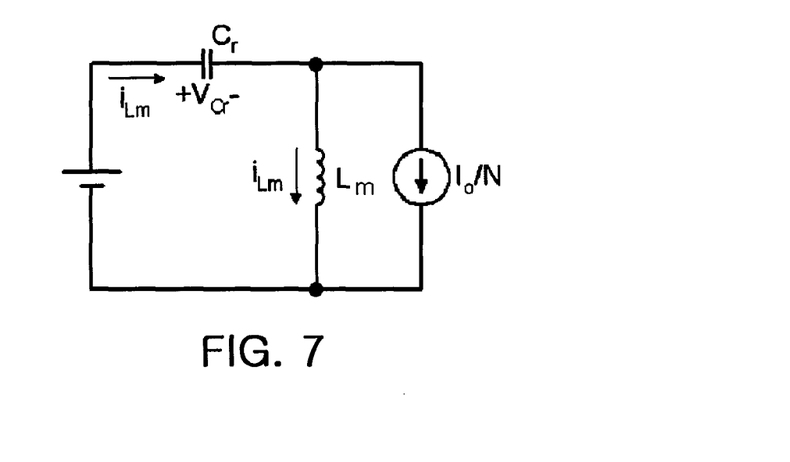
FIG. 7 is a equivalent circuit diagram illustrating a power supply according to an exemplary embodiment of the invention.

FIGS. 6A, 6B, and 6C are views illustrating the principle in which output power of a power supply has a constant voltage according to an exemplary embodiment of the invention. FIG. 7 is an equivalent circuit diagram of a power supply according to an exemplary embodiment of the invention.

In FIGS. 6A, 6B, and 6C, a rectified voltage $V_{rec}$ according to the switching frequency is shown. As shown therein, in FIG. 6A, a rectified voltage $V_{rec}$ is shown when the switching frequency is high, in FIG. 6C, a rectified voltage $V_{rec}$ is shown when the switching frequency is low, and in FIG. 6B, a rectified voltage $V_{rec}$ is shown when the switching frequency is intermediate between the switching frequency of FIG. 6A and the switching frequency of FIG. 6C.

The rectified voltage $V_{rec}$ is a voltage obtained by dividing the input voltage $V_{in}$ and the voltage $V_{cr}$ of the series boost capacitor by a turn ratio N of primary and secondary windings of the transformer T. On the assumption that the input voltage $V_{in}$ is constant, the waveform of the rectified voltage $V_{rec}$ is varied by the voltage $V_{cr}$ of the series boost capacitor. Here, the voltage $V_{cr}$ of the series boost capacitor has a maximum value increasing with a decrease in resonant frequency caused by resonance of the series boost capacitor Cr and the magnetized inductor Lm.

Since the output voltage Vo is obtained by smoothing the rectified voltage by the output inductor Lo and the output capacitor Co, the output voltage Vo is an average of the rectified voltage $V_{rec}$.

As shown in FIG. 6C, as the switching frequency is decreased, an area B becomes larger than an area A. The output voltage Vo, which is the average of the rectified voltage $V_{rec}$, is increased. That is, the power supply according to the embodiment of the invention fixes a switching duty cycle in order to ensure high efficiency, and correspondingly varies switching frequency for the regulation of the output voltage. Since the voltage from the series boost capacitor Cr is varied by a variation in switching frequency, as shown in FIGS. 6A, 6B, and 6C, the area A and the area B are varied according to the switching frequency to provide the regulation of the output voltage.

The regulation of the output voltage will be described in detail with reference to FIG. 7. FIG. 7 is an equivalent circuit diagram of a power supply that operates from the time $t_0$ the time $t_1$, shown in FIG. 2, according to an exemplary embodiment of the invention.

In the LC resonance circuit of FIG. 7, the voltage $V_{cr}$ of the series boost capacitor Cr and the current $i_{Lm}$ of the magnetized inductor Lm(t) are expressed by differential equations as follows:

$$C \frac{dV_{cr}(t)}{dt} = i_{Lm}(t) + \frac{I_o}{N} \quad \text{Equation 5}$$
$$V_{in} = V_{cr} + L_m \frac{di_{Lm}(t)}{dt}.$$

Here, the series boost capacitor Cr and the magnetized inductor Lm have initial values satisfying the following equation:

$$V_{cr}(t_0) = -V_v$$

$$i_{Lm}(t_0) = -I_v \quad \text{Equation 6.}$$

By solving Equations 5 and 6, the voltage $V_{cr}$ of the series boost capacitor Cr and the current $i_{Lm}(t)$ of the magnetized inductor Lm can be obtained from the following equation:

$$V_{cr}(t) = -Z\left(I_V - \frac{I_o}{N}\right)\sin(\omega t) - (V_V + V_{in})\cos(\omega t) + V_{in} \quad \text{Equation 7}$$

$$i_{Lm}(t) = -\left(I_V - \frac{I_o}{N}\right)\cos(\omega t) + \frac{(V_V + V_{in})}{Z}\sin(\omega t) - \frac{I_o}{N}.$$

Here, a characteristic impedance Z and a resonant angular frequency w satisfy the following equation:

$$Z = \sqrt{\frac{L_m}{C_r}} \quad \text{Equation 8}$$

$$\omega = \frac{1}{\sqrt{L_m C_r}}.$$

According to the above equations, the voltage $V_{cr}$ of the series boost capacitor Cr and the current $i_{Lm}(t)$ of the magnetized inductor Lm become the maximum voltage $V_v$ and the maximum current $i_v$, respectively, after a half switching cycle from the time $t_0$ the time $t_1$, satisfying the following equation:

$$V_{cr}\left(\frac{T_s}{2}\right) = -Z\left(I_V - \frac{I_o}{N}\right)\sin\left(\omega \frac{T_s}{2}\right) - \quad \text{Equation 9}$$

$$(V_V + V_{in})\cos\left(\omega \frac{T_s}{2}\right) + V_{in}$$

$$= V_V$$

$$i_{Lm}\left(\frac{T_s}{2}\right) = -\left(I_V - \frac{I_o}{N}\right)\cos\left(\omega \frac{T_s}{2}\right) +$$

$$\frac{(V_V + V_{in})}{Z}\sin\left(\omega \frac{T_s}{2}\right) - \frac{I_o}{N}$$

$$= I_V.$$

By solving the above-described equation, the maximum voltage $V_v$ and the maximum current $i_v$ can be obtained from the following equation:

$$V_V = Z\frac{I_o}{N}\frac{\sin(0.5\omega/f_{sw})}{1+\cos(0.5\omega/f_{sw})} \quad \text{Equation 10}$$

$$I_V = \frac{V_{in}}{Z}\frac{\sin(0.5\omega/f_{sw})}{1+\cos(0.5\omega/f_{sw})}.$$

Considering that the average of the rectified voltage $V_{rec}$ of the secondary winding is equal to the output voltage Vo, as shown in FIGS. 6A, 6B, and 6C, the output voltage Vo satisfies the following equation:

$$v_0 = \frac{1}{T_s/2}\int_0^{T_s/2}\frac{1}{N}[V_{in} - V_{Cr}(t)]dt \quad \text{Equation 11}$$

$$= \frac{2}{NT_s}\left[\frac{Z}{\omega}\left(I_V - \frac{I_o}{N}\right)\left\{\cos\left(\omega\frac{T_s}{2}\right) - 1\right\} - \frac{V_V + V_{in}}{\omega}\sin\left(\omega\frac{T_s}{2}\right)\right].$$

When the maximum voltage $V_v$ and the current $i_v$ obtained in Equation 10 are substituted in Equation 11, the output voltage according to the switching frequency can be obtained from the following equation:

$$V_o = \frac{4f_{sw}}{N\omega}\frac{\sin(0.5\omega/f_{sw})}{1+\cos(0.5\omega/f_{sw})}V_{in} \quad \text{Equation 12}$$

$$\frac{NV_o}{V_{in}} = \frac{2}{\pi f_o/f_{sw}}\frac{\sin(\pi f_o/f_{sw})}{1+\cos(\pi f_o/f_{sw})}$$

$$= \frac{2}{\pi F}\frac{\sin(\pi F)}{1+\cos(\pi F)}.$$

Referring to Equations 10 to 12, the output voltage Vo has no relation with the load. However, the output voltage Vo varies according to the switching frequency $f_{sw}$, the resonant frequency $f_o$, and the turn ratio N of the primary and secondary windings of the transformer.

Here, once the turn ratio N of the transformer T is determined, it is difficult to change the turn ratio N. It is also difficult to change a resonant frequency $f_o$ once the capacitance of the series boost capacitor Cr and the inductance of the magnetized inductor Lm are determined. The output voltage Vo is changed by varying the switching frequency $f_{sw}$ by the control signals S1 to S4 of the control unit 140, such that the regulation of the output voltage Vo can be maintained. Here, the series boost capacitor Cr preferably has a small capacitance in order to be sensitive to the switching frequency $f_{sw}$. Further, the resonant frequency $f_o$ by the capacitance of the series boost capacitor Cr and the inductance of the magnetized inductor Lm is preferably lower than the switching frequency $f_{sw}$.

As set forth above, according to exemplary embodiments of the invention, high efficiency can be achieved by fixing a switching duty cycle to 50%, and varying switching frequency.

While the present invention has been shown and described in connection with the exemplary embodiments, it will be apparent to those skilled in the art that modifications and variations can be made without departing from the spirit and scope of the invention as defined by the appended claims.

What is claimed is:

1. A variable switching frequency type power supply comprising:
    a switching unit configured to switch input power;
    a transformation unit configured to convert a voltage level of the power switched by the switching unit into a predetermined voltage level;
    a rectification unit configured to rectify the power converted by the transformation unit; and
    a control unit configured to fix a switching duty cycle of the switching unit to a predetermined switching duty cycle, and varying switching frequency of the switching unit according to a voltage level of output power,
    wherein the transformation unit comprises:
        a transformer configured to convert the voltage level of the power switched by the switching unit according to a predetermined turns ratio between a primary winding electrically coupled to the switching unit and a secondary winding electrically coupled to the rectification unit;
        a series boost capacitor connected in series between the switching unit and the primary winding of the transformer and configured to boost the power switched by the switching unit; and
        a magnetized inductor connected in parallel with the primary winding of the transformer, and resonating with the series boost capacitor, wherein a resonant frequency of the series boost capacitor and the magnetized inductor is lower than the switching frequency of the switching unit.

2. The variable switching frequency type power supply of claim 1, wherein the switching unit switches the input power by using one switching method between a full bridge switching method of using two pairs of switches connected in parallel with an input power terminal, each pair of switches being connected in series with each other, and a half bridge switching method of using one pair of switches connected in series with each other, and connected in parallel with the input power terminal.

3. The variable switching frequency type power supply of claim 2, wherein the half bridge method further comprises one pair of capacitors connected in series with each other, and connected in parallel with the input power terminal.

4. The variable switching frequency type power supply of claim 1, wherein a center tap is provided on the secondary winding to halve the number of turns of the secondary winding.

5. The variable switching frequency type power supply of claim 1, wherein the rectification unit rectifies the power converted by the transformation unit by using one rectification method among a full wave rectification method of using four diodes electrically connected between the secondary winding of the transformer and an output power terminal, a half wave rectification method of using two diodes connected in series with each other between the secondary winding and the output power terminal, and a rectification method of using two diodes connected in parallel with the secondary winding and having anodes connected in series with each other.

6. The variable switching frequency type power supply of claim 5, wherein the rectification unit further comprises:
   an output inductor reducing a pulsation current of the power rectified by the diodes; and
   an output capacitor charging the power rectified by the diodes to stabilize the power.

7. A switching frequency type power supply comprising:
   a switching unit configured to switch input power;
   a transformation unit configured to convert a voltage level of the power switched by the switching unit into a predetermined voltage level; and
   a rectification unit configured to rectify the power converted by the transformation unit;
   wherein the transformation unit comprises:
      a transformer having a primary winding and a secondary winding, the transformer being configured to convert the voltage level of the power switched by the switching unit according to a predetermined turns ratio between the primary winding electrically coupled to the switching unit and the secondary winding electrically coupled to the rectification unit;
      a capacitor connected between the switching unit and a first end of the primary winding;
      a first inductor connected between the switching unit and a second end of the primary winding; and
      a second inductor connected between the first and second ends of the primary winding,
   a resonant frequency of the capacitor and the second inductor being lower than the switching frequency of the switching unit.

8. The variable switching frequency type power supply of claim 7, wherein the switching unit switches the input power by using one switching method between a full bridge switching method of using two pairs of switches connected in parallel with an input power terminal, each pair of switches being connected in series with each other, and a half bridge switching method of using one pair of switches connected in series with each other, and connected in parallel with the input power terminal.

9. The variable switching frequency type power supply of claim 8, wherein the half bridge method further comprises one pair of capacitors connected in series with each other, and connected in parallel with the input power terminal.

10. The variable switching frequency type power supply of claim 7, wherein a center tap is provided on the secondary winding to halve the number of turns of the secondary winding.

11. The variable switching frequency type power supply of claim 7, wherein the rectification unit rectifies the power converted by the transformation unit by using one rectification method among a full wave rectification method of using four diodes electrically connected between the secondary winding of the transformer and an output power terminal, a half wave rectification method of using two diodes connected in series with each other between the secondary winding and the output power terminal, and a rectification method of using two diodes connected in parallel with the secondary winding and having anodes connected in series with each other.

12. The variable switching frequency type power supply of claim 11, wherein the rectification unit further comprises:
   an output inductor reducing a pulsation current of the power rectified by the diodes; and
   an output capacitor charging the power rectified by the diodes to stabilize the power.

* * * * *